United States Patent
Iesaki (10) Patent No.: US 8,248,008 B2
(45) Date of Patent: Aug. 21, 2012

(54) MOTOR CONTROL DEVICE, IMAGE FORMING APPARATUS, AND MOTOR CONTROL METHOD

(75) Inventor: Kenichi Iesaki, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 255 days.

(21) Appl. No.: 12/728,889

(22) Filed: Mar. 22, 2010

(65) Prior Publication Data

US 2010/0245409 A1    Sep. 30, 2010

(30) Foreign Application Priority Data

Mar. 31, 2009 (JP) ................. 2009-085996

(51) Int. Cl.
 *H02P 7/285* (2006.01)
(52) U.S. Cl. ............ 318/400.04; 318/702; 318/629; 318/625; 318/626; 318/627
(58) Field of Classification Search .......... 318/400.04, 318/702, 629, 625–628
 See application file for complete search history.

(56) References Cited

U.S. PATENT DOCUMENTS

| | | | | |
|---|---|---|---|---|
| 6,892,038 | B2 * | 5/2005 | Fukutani | 399/68 |
| 7,634,208 | B2 * | 12/2009 | Sugiyama | 399/68 |
| 2005/0120444 | A1 | 6/2005 | Takenaka | |
| 2010/0245450 | A1 | 9/2010 | Iesaki | |

FOREIGN PATENT DOCUMENTS

| | | |
|---|---|---|
| JP | H02-010411 A | 1/1990 |
| JP | H07-046874 A | 2/1995 |
| JP | H09-282008 A | 10/1997 |
| JP | H11-031014 A | 2/1999 |
| JP | 2004-110636 A | 4/2004 |
| JP | 2006-301682 A | 11/2006 |
| JP | 2007-283561 A | 11/2007 |
| JP | 2008-137449 A | 6/2008 |
| WO | 03/058355 A1 | 7/2003 |

OTHER PUBLICATIONS

Japan Patent Office, Notice of Reason(s) for Rejection for Patent Application No. JP 2009-085997 (counterpart to above-captioned patent application), mailed Feb. 15, 2011.

* cited by examiner

*Primary Examiner* — Walter Benson
*Assistant Examiner* — David Luo
(74) *Attorney, Agent, or Firm* — Baker Botts L.L.P.

(57) ABSTRACT

A motor control device includes a measurement unit, a speed control unit, a correction unit, a drive unit, and a disturbance suppressing unit. During a time period before a measurement value of speed of one of a motor and a driven object which is driven by the motor measured by the measurement unit becomes greater than zero the correction unit corrects a manipulated variable such that a reduced correction amount which is from zero percent to less than 100 percent of a correction amount determined by the disturbance suppressing unit, is added to the manipulated variable determined by the speed control unit corresponding to a target speed of the one of the motor and the driven object.

15 Claims, 8 Drawing Sheets

MOTOR CONTROL DEVICE, IMAGE FORMING APPARATUS, AND MOTOR CONTROL METHOD

CROSS-REFERENCE TO RELATED APPLICATIONS

This application claims the benefit of Japanese Patent Application No. 2009-085996 filed Mar. 31, 2009 in the Japan Patent Office, the disclosure of which is incorporated herein by reference.

BACKGROUND

This invention relates to a motor control technology.

Figure 7:
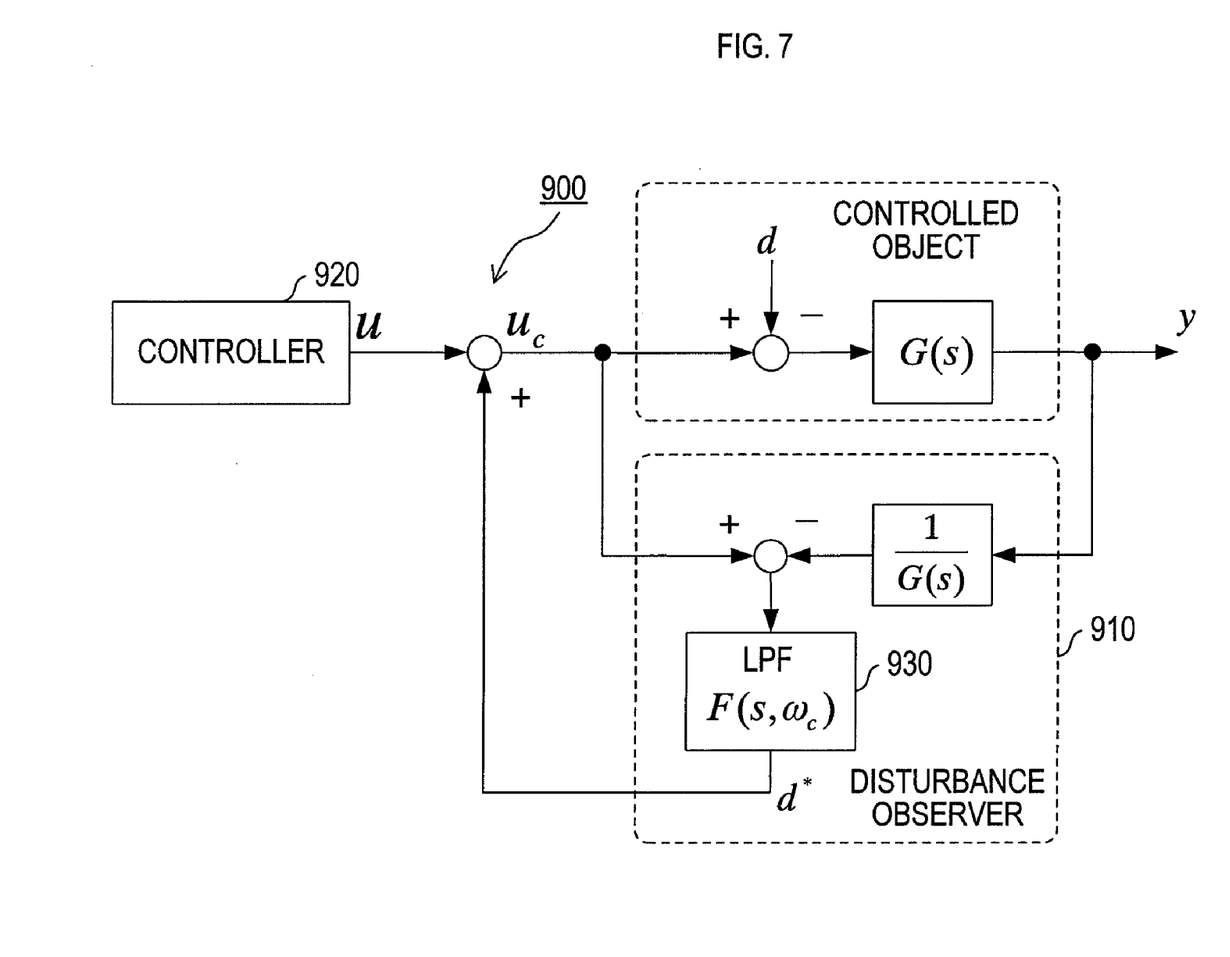
FIG. 7 is a block diagram showing a conventional motor control system.

Conventionally, a control system is known in which disturbance is estimated by a disturbance observer and a control input is corrected based on the estimated disturbance. FIG. 7 is a block diagram of a conventional motor control system 900 using a disturbance observer 910.

The control system shown in FIG. 7 is designed as follows. First, a transfer function G(s) of a controlled object (plant) is derived. Then, on the assumption that a relationship between a control output y and a control input u satisfies y=G(s)·u, a controller 920 is designed to output the control input u corresponding to a target control output $y_r$.

The control input u outputted from the controller 920 is corrected by adding thereto a correction amount d* generated in the disturbance observer 910. Disturbance is suppressed by inputting a corrected control input $u_c$=u+d* into the controlled object, and the control output y is controlled to the target control output $y_r$.

Specifically, the disturbance observer 910 generates a correction signal ($u_c$−1/G(s)·y) for suppressing disturbance based on an inverse model 1/G(s) of the transfer function G(s) and the control input $u_c$. The disturbance observer 910 filters the correction signal through a low-pass filter 930, and outputs a filtered correction signal as a correction signal representing the above correction amount d*.

A reason why the correction signal ($u_c$−1/G(s)·y) is filtered through the low-pass filter 930 is because of frequency characteristics exhibited by the transfer function G(s) of the controlled object and by the inverse model 1/G(s). That is, while the transfer function G(s) exhibits frequency characteristics in which the higher a frequency of an input signal to the transfer function G(s) is, the lower a gain becomes; the inverse model 1/G(s) exhibits frequency characteristics in which the higher a frequency of an input signal to the inverse model 1/G(s) is, the higher the gain becomes.

Accordingly, when a measured control output y is inputted into the inverse model 1/G(s) to generate the correction signal ($u_c$−1/G(s)·y), observation noise included in high-frequency band is amplified in the correction signal. Therefore, the low-pass filter 930 is used to suppress influence of the observation noise and accurately achieve disturbance suppression.

Also, there is a known motor control system using estimated disturbance by a disturbance observer in which a control input to a motor is corrected so as to compensate a motor torque corresponding to the static friction, by considering that it takes substantial time before a motor torque overcomes static friction to displace a driven object.

SUMMARY

In a case where an encoder is used to measure a rotational speed of a motor or speed of a driven object which is driven by the motor and controls the rotational speed of the motor or the speed of the driven object, the rotational speed of the motor or the speed of the driven object cannot be measured at an initial stage of rotation of the motor where the motor starts to rotate. For this reason, there may be cases where a motor torque becomes excessively large at the initial stage of the rotation of the motor, and thus, the driven object is abruptly accelerated.

Figure 8:
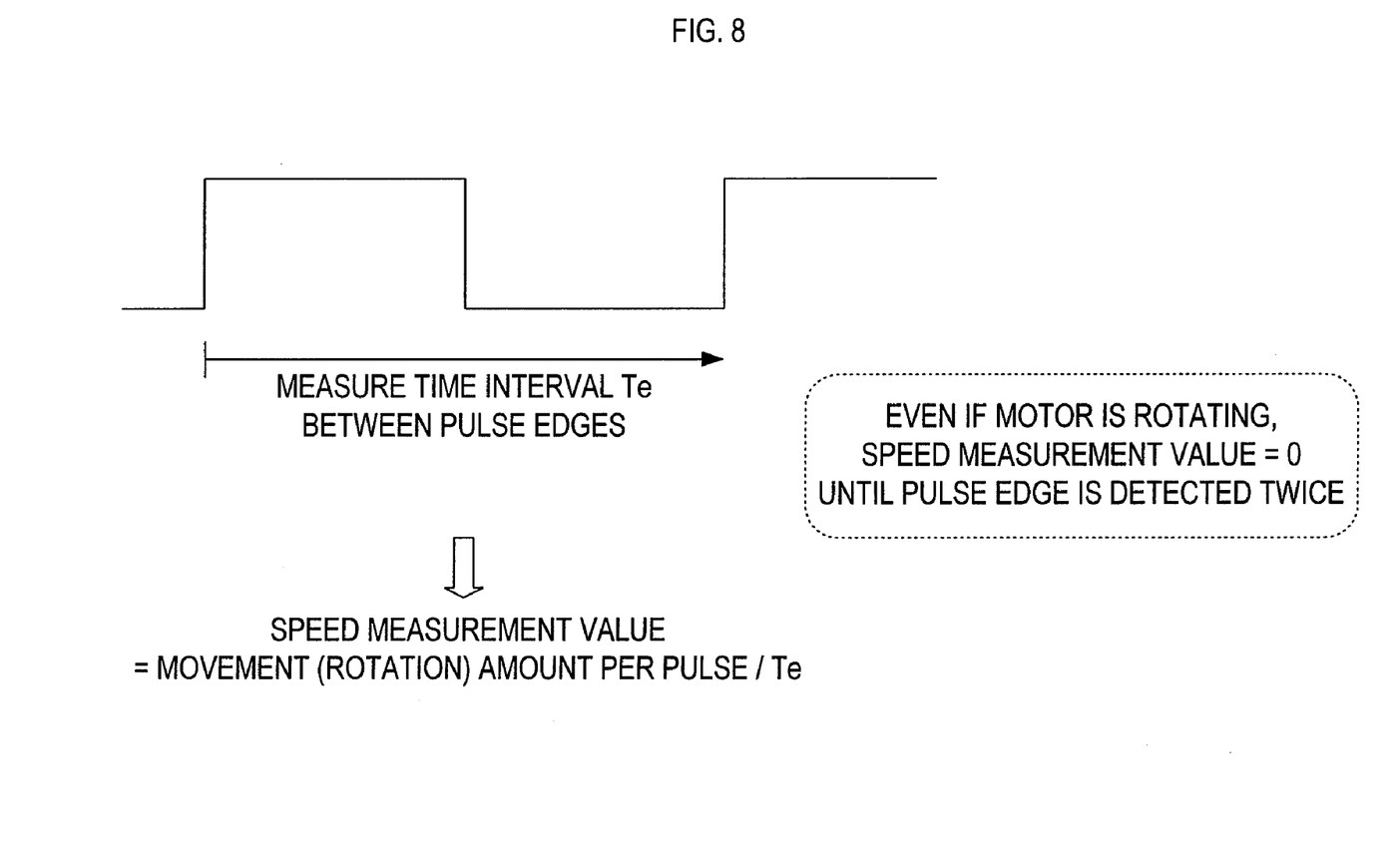
FIG. 8 is an explanatory view concerning speed measurement using an encoder.

Specifically, when the encoder is used to measure the rotational speed of the motor or the speed of the driven object, the rotational speed of the motor or the speed of the driven object are measured by measuring time intervals between edges of pulse signals inputted from the encoder, as shown in FIG. 8.

When speed is measured by the above explained method, however, the speed cannot be substantially measured unless at least two pulses are inputted from the encoder. In other words, until the motor rotates or the driven object moves to such an extent that the at least two pulses are inputted from the encoder, a measurement value of the speed remains zero.

As above, in a conventional technique, even if the motor torque actually overcomes static friction and the motor starts rotating, the disturbance observer, assuming that the motor is not rotating, overestimates disturbance, thereby deriving an excessive correction amount. As a result, the motor torque becomes excessively large, and thus, the driven object is abruptly accelerated.

The above explained fact is also obvious from the constitution of the motor control system 900 shown in FIG. 7. Specifically, if a measurement value of the control output y is zero, an output of the inverse model 1/G(s) becomes zero, and thereby the correction amount d* is abruptly increased. Thus, even if a dead band, from when the motor torque overcomes static friction and the motor starts rotating to when the measurement value of the speed becomes greater than zero, is a very short period of time, the motor torque becomes excessively large during the short period. As a result, the driven object is abruptly accelerated.

In one aspect of the present invention, it is preferable to inhibit abrupt acceleration of a driven object which is driven by a motor during a time period before a measurement value of speed of a motor or the driven object becomes greater than zero.

A motor control device according to a first aspect of the present invention includes a measurement unit, a speed control unit, a correction unit, a drive unit, and a disturbance suppressing unit.

The measurement unit measures speed of one of a motor and a driven object which is driven by the motor. The speed control unit determines a manipulated variable for the motor, corresponding to a target speed of the one of the motor and the driven object. The correction unit corrects the manipulated variable determined by the speed control unit. The drive unit drives the motor based on a corrected manipulated variable corrected by the correction unit. The disturbance suppressing unit estimates disturbance, based on the corrected manipulated variable corrected by the correction unit and the measurement value of the speed measured by the measurement unit, thereby determining a correction amount to correct the manipulated variable obtained by the speed control unit so as to suppress the disturbance.

During a time period before the measurement value of the speed becomes greater than zero, the correction unit corrects the manipulated variable by adding a reduced correction amount which is from zero percent to less than 100 percent of the correction amount determined by the disturbance suppressing unit, to the manipulated variable determined by the speed control unit.

According to the motor control device constituted as above, during the time period before the measurement value of the speed becomes greater than zero, the reduced correction amount, which is from zero percent to less than 100 percent of the correction amount determined by the disturbance suppressing unit, is added to the manipulated variable determined by the speed control unit. Accordingly, even if the disturbance suppressing unit overestimates disturbance and derives an excessive correction amount during a time period from when one of the motor and the driven object overcomes static friction and starts moving to when the measurement value of the speed measured by the measurement unit becomes greater than zero, excessive correction of the manipulated variable determined by the speed control unit can be inhibited. Thus, the present motor control device can inhibit abrupt acceleration of the motor or the driven object.

An image forming apparatus according to a second aspect of the present invention includes an image forming unit, a motor, a measurement unit, a speed control unit, a correction unit, a drive unit, and a disturbance suppressing unit.

The image forming unit forms an image onto a sheet. The motor conveys the image forming unit. The measurement unit measures speed of one of the motor and the image forming unit. The speed control unit determines a manipulated variable for the motor, corresponding to a target speed of the one of the motor and the image forming unit. The correction unit corrects the manipulated variable determined by the speed control unit. The drive unit drives the motor based on a corrected manipulated variable corrected by the correction unit. The disturbance suppressing unit estimates disturbance, based on the corrected manipulated variable corrected by the correction unit and the measurement value of the speed measured by the measurement unit, thereby determining a correction amount to correct the manipulated variable obtained by the speed control unit so as to suppress the disturbance.

During a time period before the measurement value of the speed becomes greater than zero, the correction unit corrects the manipulated variable by adding a reduced correction amount which is from zero percent to less than 100 percent of the correction amount determined by the disturbance suppressing unit, to the manipulated variable determined by the speed control unit.

According to the image forming apparatus constituted as above, it is possible to suppress occurrence of tilting of the image forming unit due to abrupt acceleration, and thus, possible to suppress deterioration in quality of an image formed onto a sheet.

A motor control method according to a third aspect of the present invention includes a measurement step, a speed control step, a correction step, a drive step, and a disturbance suppress step.

In the measurement step, speed of one of a motor and a driven object which is driven by the motor is measured. In the speed control step, a manipulated variable for the motor, corresponding to a target speed of the one of the motor and the driven object, is determined. In the correction step, the manipulated variable determined in the speed control step is corrected. In the drive step, the motor is driven based on a corrected manipulated variable corrected in the correction step. In the disturbance suppress step, a correction amount to correct the manipulated variable obtained in the speed control step is determined by estimating disturbance, based on the corrected manipulated variable corrected in the correction step and the measurement value of the speed measured in the measurement step, so as to suppress the disturbance.

During a time period before the measurement value of the speed becomes greater than zero, in the correction step, a reduced correction amount which is from zero percent to less than 100 percent of the correction amount determined in the disturbance suppressing step is added to the manipulated variable determined in the speed control step, thereby correcting the manipulated variable.

The motor control method constituted as above can inhibit abrupt acceleration of the motor or the driven object, as in the motor control device of the first aspect.

BRIEF DESCRIPTION OF THE DRAWINGS

The invention will now be described below, by way of example, with reference to the accompanying drawings, in which.

DETAILED DESCRIPTION OF THE PREFERRED EMBODIMENT

Figure 1:
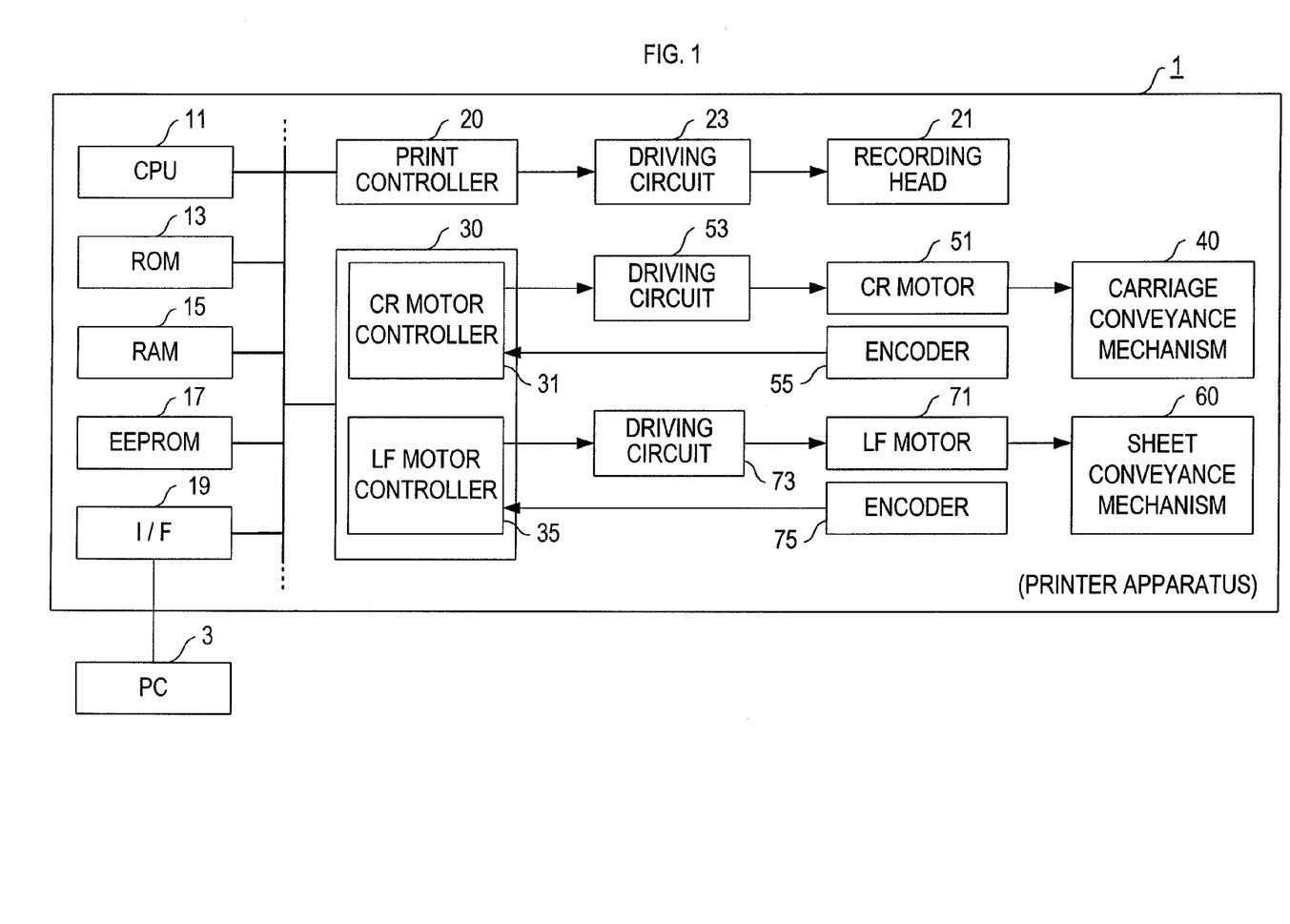
FIG. 1 is a block diagram showing a constitution of a printer apparatus in an embodiment.

A printer apparatus 1 of the present embodiment is, for example, a printer apparatus which forms an image onto a sheet by an ink jet method. As shown in FIG. 1, the printer apparatus 1 includes a CPU 11, a ROM 13, a RAM 15, an EEPROM 17, an interface (I/F) 19, a print controller 20, and a motor controller 30.

The CPU 11 executes various programs for controlling each unit of the printer apparatus 1. The ROM 13 stores the various programs executed by the CPU 11 and others. The RAM 15 serves as a work area during execution of the programs by the CPU 11. The EEPROM 17 stores various setting information related to the printer apparatus 1. The interface 19 is, for example, a USB interface. The interface 19 is connected to a personal computer (PC) 3 and receives a print command transmitted from the PC 3 and print object data transmitted together with the print command.

The printer apparatus 1 also includes a recording head 21, a head driving circuit 23, a carriage (CR) motor 51, a driving circuit 53, and an encoder 55.

The recording head 21 includes a plurality of nozzles for ejecting ink droplets arranged thereon. The head driving circuit 23 drives the recording head 21 to eject ink droplets therefrom. The CR motor 51 is, for example, a direct current motor. The CR motor 51 provides drive power to a later-explained carriage conveyance mechanism 40 and moves a carriage 41 (see FIG. 2) carrying the recording head 21 in a main scanning direction. The driving circuit 53 drives the CR motor 51. The encoder 55 is a so-called rotary encoder. The encoder 55 is provided on a rotation shaft of the CR motor 51 and outputs pulse signals each time the CR motor 51 rotates a predetermined angle.

The printer apparatus 1 further includes a sheet conveyance mechanism 60, a line feed (LF) motor 71, a driving circuit 73, and an encoder 75.

The sheet conveyance mechanism 60 is a mechanism for conveying a sheet to a printing position where the recording head 21 performs printing. More particularly, the sheet conveyance mechanism 60 includes a plurality of conveyance rollers 61 (see FIG. 2) having rotation shafts in the main scanning direction. The sheet conveyance mechanism 60 is configured to convey the sheet sandwiched between the conveyance rollers 61 in a sub-scanning direction due to rotation of the conveyance rollers 61. The LF motor 71 is, for example, a direct current motor. The LF motor 71 provides drive power to the conveyance rollers 61 provided in the sheet conveyance mechanism 60, thereby rotating the conveyance rollers 61. The driving circuit 73 drives the LF motor 71. The encoder 75 is a rotary encoder. The encoder 75 is provided on a rotation shaft of the LF motor 71 and outputs pulse signals each time the LF motor 71 rotates a predetermined angle.

Figure 2:
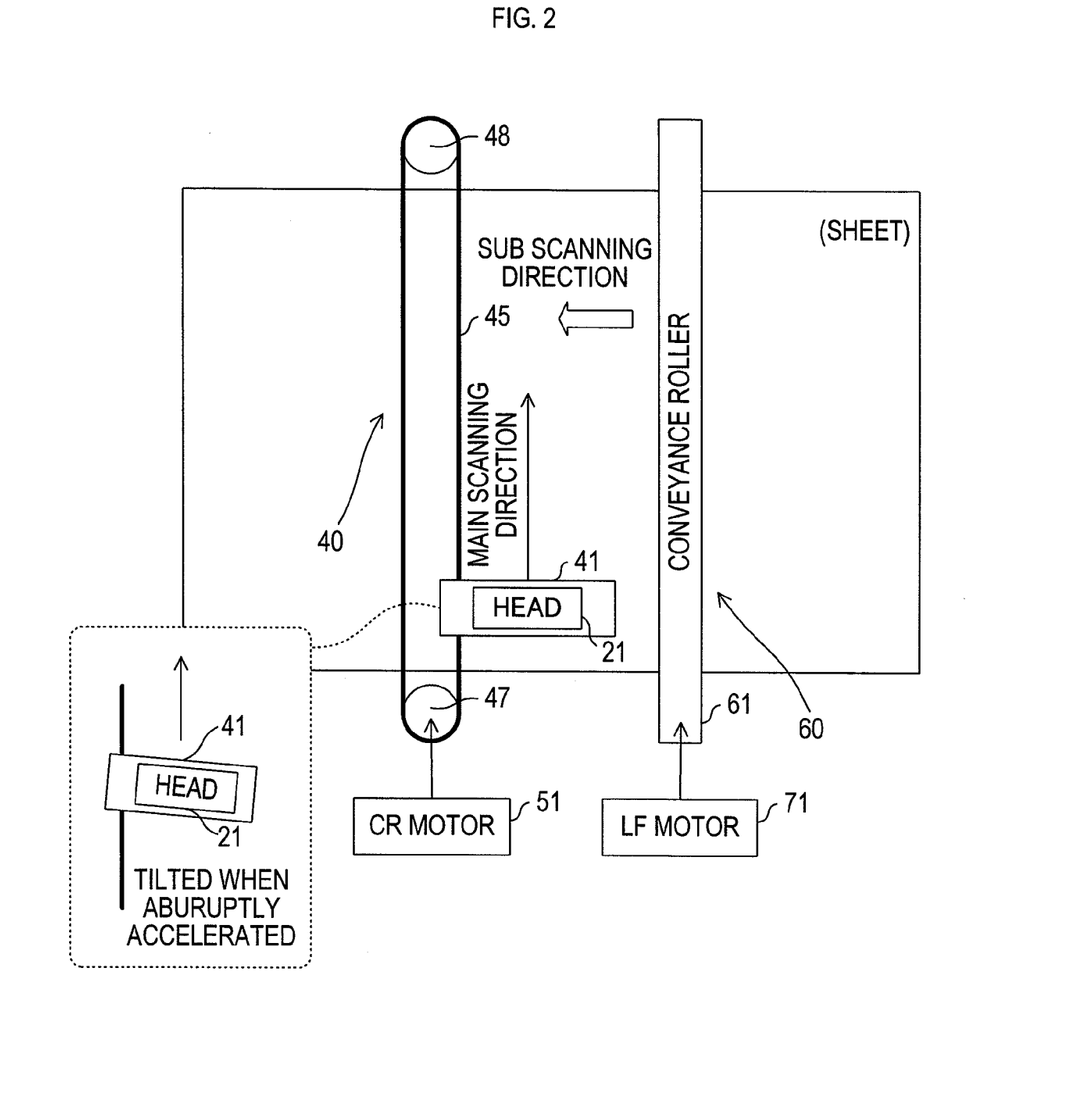
FIG. 2 is an explanatory view showing a schematic constitution of a carriage conveyance mechanism and a sheet conveyance mechanism in the printer apparatus.

As shown in FIG. 2, in the carriage conveyance mechanism 40, the carriage 41 is slidably mounted on a guide shaft (not shown) extending in the main scanning direction and is connected to an endless belt 45.

The endless belt 45 is held between a pulley 47 and an idle pulley 48. The endless belt 45 receives drive power from the CR motor 51 via a gear (not shown) provided on a rotation shaft of the pulley 47. That is to say, in the carriage conveyance mechanism 40, the endless belt 45 rotates in accordance with rotation of the pulley 47, and thereby the carriage 41 moves in the main scanning direction along the guide shaft (not shown).

In the present embodiment, the recording head 21 mounted on the carriage 41 is constituted in the same manner as a known piezo type inkjet head. That is, when a driving voltage is applied to the recording head 21 from the head driving circuit 23, the recording head 21 deforms a piezoelectric portion of the recording head 21, which is adjacent to an ink chamber of the recording head 21, thereby changing a volume of the ink chamber. As a result, ink inside the ink chamber is ejected toward the sheet from the nozzles of the recording head 21. The recording head 21 moves in the main scanning direction by being conveyed by the carriage 41 which moves as explained above.

The sheet conveyance mechanism 60 of the present embodiment is configured such that, the conveyance rollers 61 rotate in receipt of a rotation force of the LF motor 71 via a gear (not shown), thereby the sheet is moved in the sub-scanning direction by the rotation of the conveyance rollers 61.

When an image is formed onto the sheet by the recording head 21, the sheet is conveyed as follows. The recording head 21 moves from one end to the other end in the main scanning direction at a predetermined number of times. Each time an image is formed on a predetermined number of lines of the sheet along the main scanning direction, the sheet is fed by a predetermined amount by the rotation of the conveyance rollers 61.

The print controller 20, when the interface 19 receives a print command and a print object data from the external PC 3, controls the recording head 21 through the head driving circuit 23, in accordance with a command inputted from the CPU 11, to form an image based on the print object data onto the sheet facing the recording head 21. Particularly, as in a known printer apparatus, the print controller 20 applies a driving voltage to the recording head 21 in synchronous with the movement of the carriage 41 based on the pulse signals inputted from the encoder 55, thereby the recording head 21 ejects ink droplets from the nozzles.

The motor controller 30 includes a CR motor controller 31 and a LF motor controller 35. In accordance with a command from the CPU 11, the CR motor controller 31 controls the CR motor 51 and the LF motor controller 35 controls the LF motor 71.

Specifically, the CR motor controller 31 measures an angular velocity $\omega$ of the CR motor 51 based on the pulse signals inputted from the encoder 55. Based on a result of the measurement, the CR motor controller 31 controls the angular velocity $\omega$ so that the angular velocity $\omega$ reaches a target angular velocity $\omega_r$. Through this operation, the CR motor controller 31 controls a moving speed of the carriage 41 which moves in conjunction with rotation of the CR motor 51. Specifically, the moving speed of the carriage 41 is controlled such that the carriage 41 moves at a constant speed in an area where the recording head 21 forms an image onto a sheet.

The LF motor controller 35 measures a rotation amount $\theta$ of the LF motor 71 based on the pulse signals inputted from the encoder 75. Based on a result of the measurement, the LF motor controller 35 controls the rotation amount $\theta$ so that the rotation amount $\theta$ reaches a target rotation amount $\theta_r$. Through this operation, the LF motor controller 35 controls a moving amount (feeding amount) of the sheet which moves in conjunction with rotation of the LF motor 71.

When the print command and the print object data are inputted to the CPU 11 through the interface 19, the CPU 11 operates the print controller 20 to make the recording head 21 perform an ejecting operation of ink droplets, in order to form an image based on the print object data onto the sheet. At the same time as the CPU 11 operates the print controller 20, the CPU 11 operates the CR motor controller 31 to move the carriage 41 (and therefore, the recording head 21) in the main scanning direction. Furthermore, each time the carriage 41 moves from the one end to the other end in the main scanning direction, the CPU 11 operates the LF motor controller 35 to move the sheet by a predetermined amount in the sub-scanning direction. The CPU 11 operates the print controller 20, the CR motor controller 31, and the LF motor controller 35 as explained above, and thereby, an image based on the print object data is gradually formed onto the sheet.

Now, the constitution of the CR motor controller 31 will be explained in detail.

Figure 3:
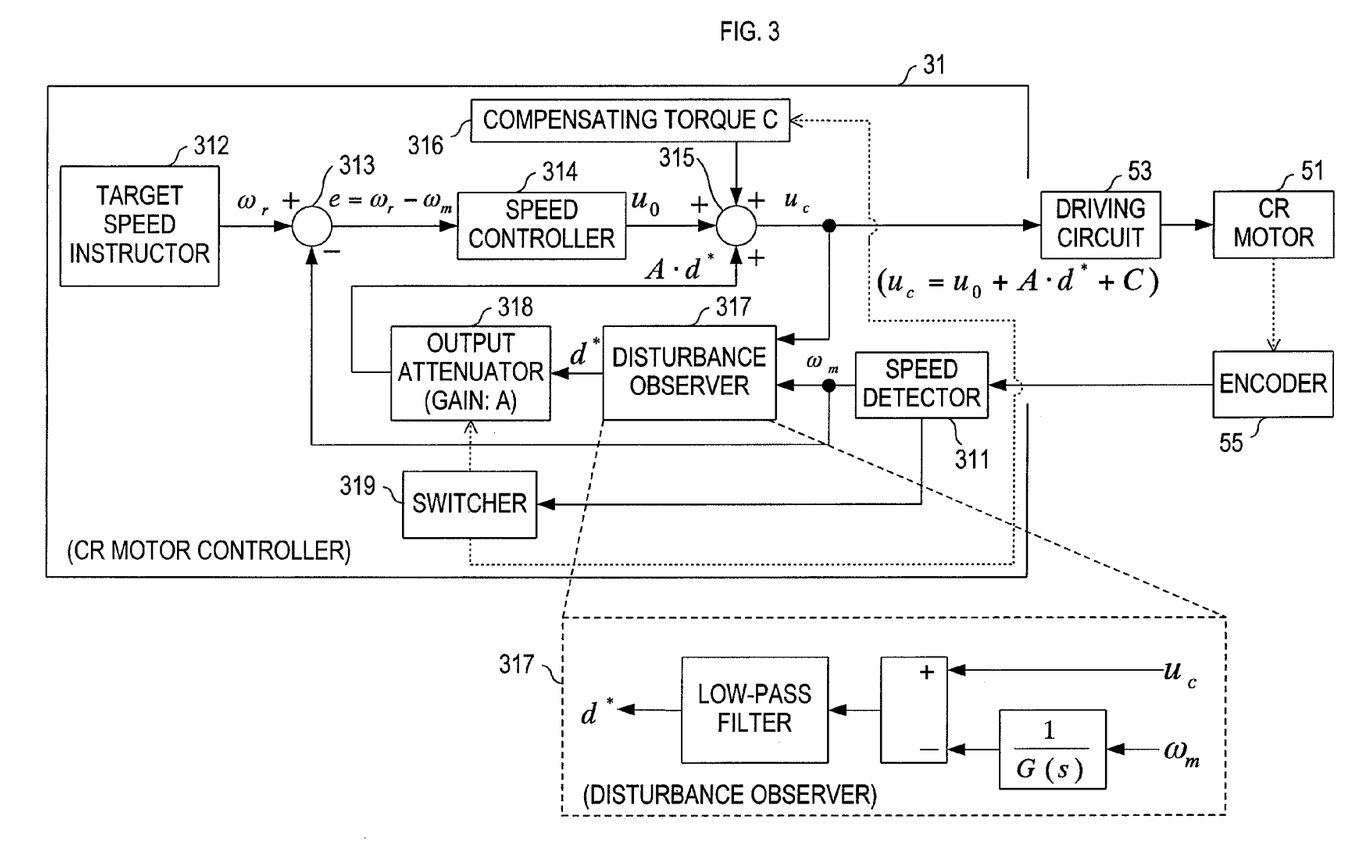
FIG. 3 is a block diagram showing a speed control system included in a carriage motor control unit in the printer apparatus.

As shown in FIG. 3, the CR motor controller 31 includes, as components for a speed control system, the following elements: a speed detector 311, a target speed instructor 312, a deviation output unit 313, a speed controller 314, a corrector 315, a compensating torque generator 316, a disturbance observer 317, an output attenuator 318, and a switcher 319.

The speed detector 311 measures the angular velocity ω of the CR motor 51 based on the pulse signals inputted from the encoder 55. The speed detector 311 inputs a measurement signal representing a measurement value $\omega_m$ of the angular velocity ω, to the deviation output unit 313, the disturbance observer 317, and the switcher 319.

The target speed instructor 312 inputs a target instruction signal representing the target angular speed $\omega_r$, to the deviation output unit 313, based on a predetermined target profile. As in a known inkjet printer, the target profile represents the target angular speed $\omega_r$ of the CR motor 51 in an acceleration area, a constant speed area, and a deceleration area for the carriage 41, those of which are provided in the main scanning direction. In the target profile of the present embodiment, the target angular speed $\omega_r$ is set such that the carriage 41 moves at a constant speed in an area where the carriage 41 ejects ink droplets to form an image onto the sheet.

The deviation output unit 313 inputs a deviation signal to the speed controller 314, based on the measurement signal of the angular velocity ω inputted from the speed detector 311 and the target instruction signal inputted from the target speed instructor 312. The deviation signal represents a deviation $e=\omega_r-\omega_m$ which is a deviation between the target angular speed $\omega_r$ and the measurement value $\omega_m$ of the angular velocity ω.

The speed controller 314 figures out a manipulated variable (control input) $u_0$ which reduces the deviation e, based on the deviation signal inputted from the deviation output unit 313. The speed controller 314 then inputs a control input signal representing the manipulated variable (control input) $u_0$ to the corrector 315. In the present embodiment, since the CR motor 51 is a current-controlled, the speed controller 314 inputs, to the corrector 315, the control input signal representing an input current to the CR motor 51, as the manipulated variable $u_0$.

The corrector 315 corrects the control input signal (the manipulated variable $u_0$) inputted from the speed controller 314, based on a correction signal inputted from the compensating torque generator 316 and a correction signal inputted from the disturbance observer 317 through the output attenuator 318. The corrector 315 then inputs a corrected control input signal (the manipulated variable $u_c$) to the driving circuit 53.

The driving circuit 53 drives the CR motor 51 with an amount of current corresponding to the manipulated variable $u_c$ represented by the control input signal inputted from the corrector 315. The driving circuit 53 drives the CR motor 51 in accordance with the manipulated variable $u_c$ inputted from the corrector 315, and thereby, influence of disturbance to the angular velocity ω of the CR motor 51 can be suppressed. Thus, the CR motor 51 rotates at the target angular velocity $\omega_r$. In the present embodiment, the moving speed of the carriage 41 is controlled by controlling the angular velocity ω of the CR motor 51.

The disturbance observer 317 generates a correction signal for suppressing disturbance, in the same way as a known disturbance observer where the disturbance observer 317 obtains the control input signal inputted to the driving circuit 53 from the corrector 315 to estimate disturbance based on the control input signal and the measurement signal inputted from the speed detector 311, thereby generating a correction signal for suppressing the disturbance.

In particular, in the disturbance observer 317, a signal corresponding to a deviation between an output d1 and the manipulated variable $u_c$, i.e. $d0=u_c-d1$, is generated as the correction signal for suppressing disturbance, in which the output d1 is $d1=(1/G(s))\cdot\omega_m$ obtained by inputting the measurement signal to an inverse model $1/G(s)$ of a transfer function $G(s)$ of a controlled object, and the manipulated variable $u_c$ is represented by the control input signal inputted to the driving circuit 53 from the corrector 315. The correction signal representing the correction amount $d0=u_c-d1$ is filtered by a low-pass filter. A filtered correction signal is inputted to the output attenuator 318.

When a motor system of the CR motor 51 connected to the carriage conveyance mechanism 40 is represented using a rigid body model, the motor system may be represented by the following mathematical formula:

$$J \cdot (d\omega/dt) = K \cdot i$$

In the above mathematical formula, i represents input current to the CR motor 51, K represents a torque constant of the CR motor 51, and J represents a moment of inertia of the CR motor 51. If i is a control input (manipulated variable) u and ω is a control output y, the transfer function $G(s)$ of the CR motor 51 may be expressed by the mathematical formula below.

$$G(s) = K/(J \cdot s)$$

In the above formula, s represents a Laplace operator.

In the disturbance observer 317, the above correction signal may be generated, for example, by setting the above transfer function $G(s)$ in the transfer function $G(s)$ of the CR motor 51.

The output attenuator 318 attenuates the correction signal inputted from the disturbance observer 317, with a preset gain A from zero to one or less (i.e., from zero percent to 100 percent or less) to input an attenuated correction signal to the corrector 315. The output attenuator 318, upon receipt of the correction signal representing a correction amount d* inputted from the disturbance observer 317, outputs a correction signal representing a correction amount A·d*. The gain A is set, by the later-explained switcher 319, to a value corresponding to the measurement value $\omega_m$ of the angular velocity ω.

The compensating torque generator 316 inputs, to the corrector 315, a correction signal representing a fixed correction amount C which is set by the switcher 319. Hereinafter, the correction amount C is also referred to as a compensating torque C.

Specifically, the corrector 315 corrects the control input signal with the manipulated variable $u_0$ inputted from the speed controller 314, based on the correction signal inputted from the compensating torque generator 316 and the correction signal inputted from the disturbance observer 317 through the output attenuator 318, to input a control input signal representing the manipulated variable $u_c = u_0 + A \cdot d^* + C$ to the driving circuit 53.

The switcher 319 switches set values of the gain A of the output attenuator 318 and set values of the compensating torque C of the compensating torque generator 316, depending on the measurement value $\omega_m$. Specifically, the switcher 319, based on the measurement signal inputted from the speed detector 311, sets different values of the gain A and different values of the compensating torque C for two periods: one period before the measurement value $\omega_m$ becomes greater than zero (i.e., a period during which $\omega_m = 0$) and the other period after the measurement value $\omega_m$ becomes greater than zero (i.e., a period during which $\omega_m > 0$). The switcher 319 repeatedly executes a switching process shown in FIG. 4, thereby performing the above-explained switching operation.

Figure 4:
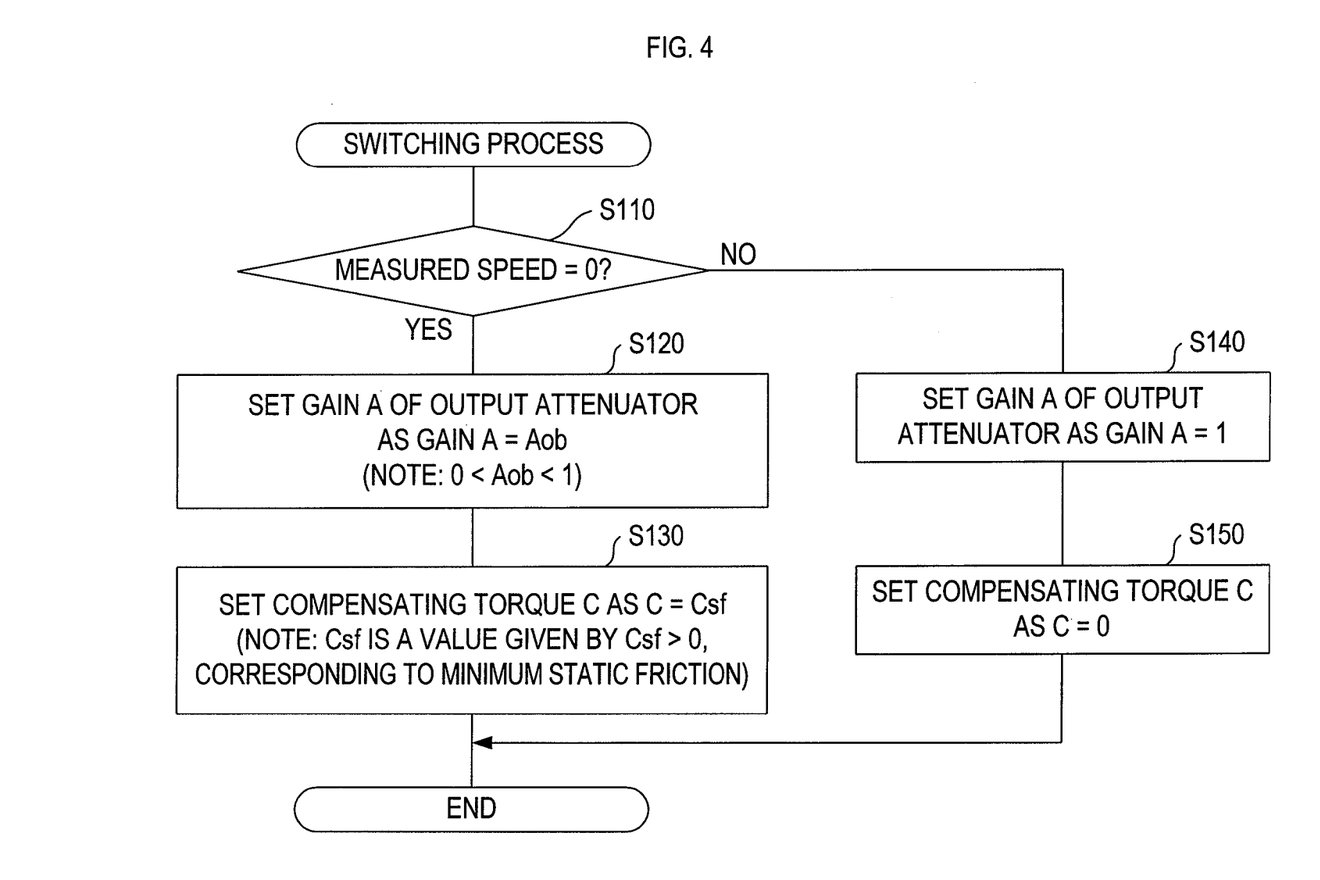
FIG. 4 is a flowchart illustrating a content of a switching process executed by a switcher in the carriage motor control unit.

As shown in FIG. 4, if the measurement value $\omega_m$ is $\omega_m = 0$ (S110: Yes), the switcher 319 sets the gain A of the output attenuator 318 to a constant Aob which satisfies a conditional expression 0<Aob<1 (S120). The conditional expression 0<Aob<1 is predetermined at a time of design. Then, the switcher 319 sets the compensating torque C of the compensating torque generator 316 to a constant Csf (S130). The constant Csf is predetermined at the time of design.

In S110, if the measurement value $\omega_m$ is $\omega_m$>0 (S110: No), the switcher 319 sets the gain A of the output attenuator 318 to value "1" (S140) and sets the compensating torque C of the compensating torque generator 316 to value "0" (S150).

By the operation of the switcher 319 as explained above, the corrector 315 corrects the manipulated variable $u_0$ as follows. During the period before the measurement value $\omega_m$ becomes greater than zero, the corrector 315 corrects the manipulated variable $u_0$ by adding a reduced correction amount A·d*, which is from zero percent to less than 100 percent of the correction amount d* determined by the disturbance observer 317, and the predetermined fixed correction amount C, to the manipulated variable $u_0$ determined by the speed controller 314. After the measurement value $\omega_m$ becomes greater than zero, the corrector 315 corrects the manipulated variable $u_0$ by adding, not the fixed correction amount C, but an equivalent correction amount which is 100 percent of the correction amount d* determined by the disturbance observer 317, to the manipulated variable $u_0$ determined by the speed controller 314.

The above constant Aob has influence on a time period before the carriage 41 starts moving and also on accuracy of acceleration at a time after the carriage 41 started moving. In this regard, a designer is required to determine the constant Aob, for example, by conducting experiments and the like, considering an acceptable accuracy of the initial acceleration of the carriage 41 and an acceptable required time period for the carriage 41 to start moving. In the present embodiment, a single constant Aob is prepared; however, a plurality of different constants Aob may be prepared, and each time the process in FIG. 4 is repeated, the different constants Aob may be set.

The constant Csf is preferably determined as follows: a minimum value of static friction which acts on the CR motor 51 is experimentally obtained, and a manipulated variable which generates a motor torque sufficient to just overcome the minimum value is set as the constant Csf. Specifically, the minimum value of static friction may be obtained such that, values of static friction are calculated under various conditions taking into account of individual differences and aging variations, etc. of the printer apparatus 1, and then, a minimum value can be selected from the values obtained by the experiments.

Figure 5:
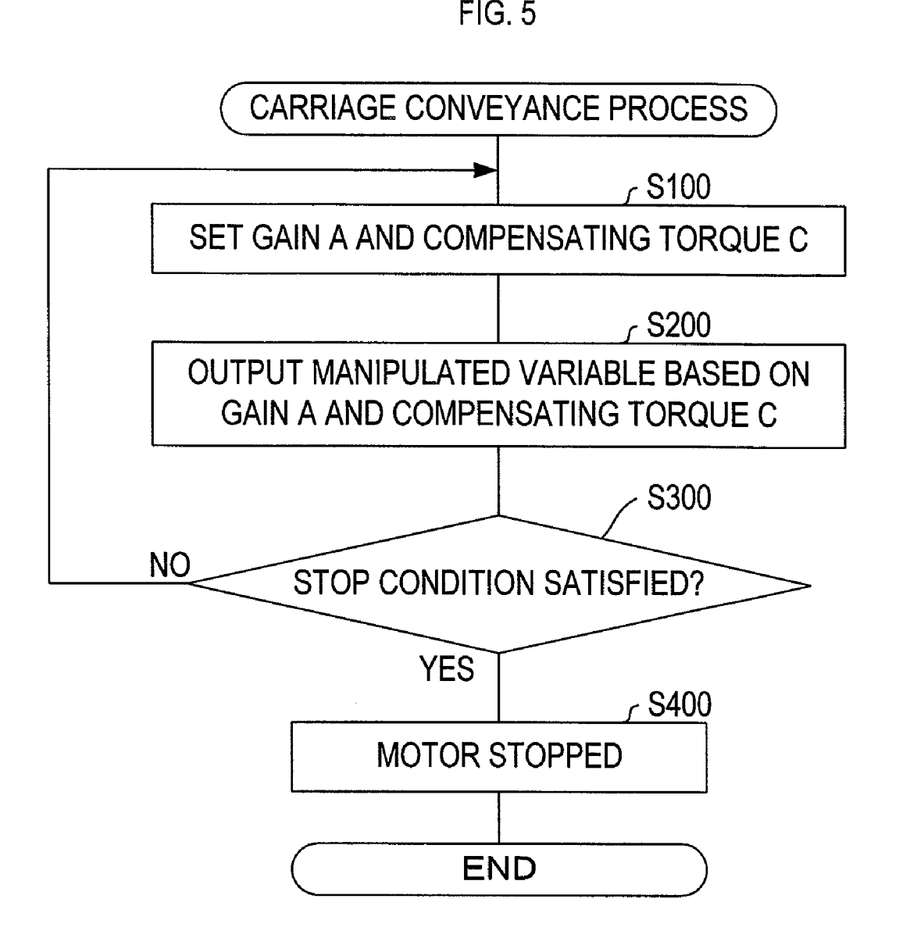
FIG. 5 is a flowchart illustrating a content of a carriage conveyance process executed by the carriage motor control unit.
Figure 6A:
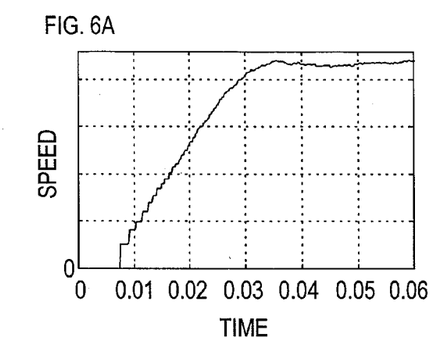
FIG. 6A is a graph illustrating effect of a motor control method of the embodiment, which shows a trajectory of an angular velocity of a carriage motor (moving speed of a carriage) from a time when conveyance of a carriage is started.
Figure 6B:
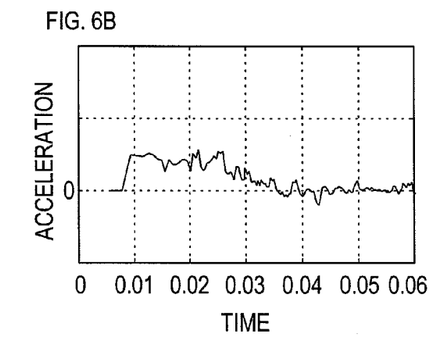
FIG. 6B is a graph showing a trajectory of acceleration, corresponding to FIG. 6A.
Figure 6C:
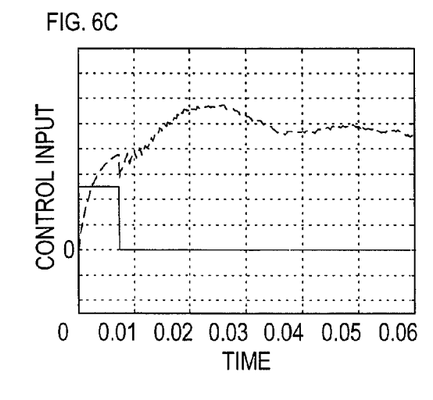
FIG. 6C is a graph showing a trajectory (broken line) of a manipulated variable $u_c$ to the carriage motor and a trajectory (solid line) of a compensating torque C, corresponding to FIG. 6A.
Figure 6D:
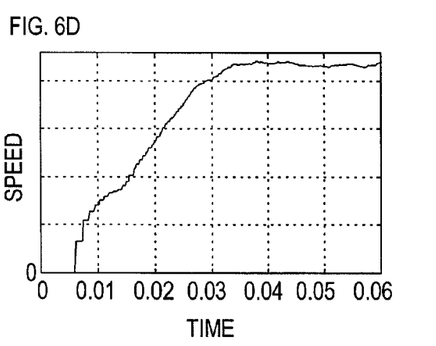
FIG. 6D is a graph illustrating effect of a conventional motor control method, which shows a trajectory of an angular velocity of a carriage motor (moving speed of a carriage) from a time when conveyance of a carriage is started.
Figure 6E:
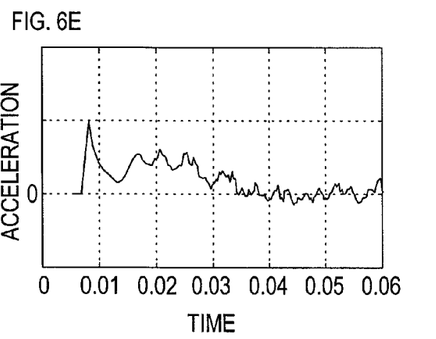
FIG. 6E is a graph showing a trajectory of acceleration, corresponding to FIG. 6D.
Figure 6F:
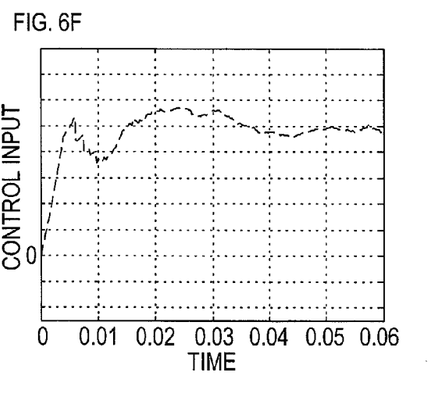
FIG. 6F is a graph showing a trajectory (broken line) of a manipulated variable $u_c$ to the carriage motor, corresponding to FIG. 6D.

As shown in FIG. 5, when the CR motor controller 31 starts conveying the carriage 41 upon receipt of a command from the CPU 11, the CR motor controller 31 repeatedly performs a setting operation (S100) and a subsequent output operation (S200) until a stop condition of the CR motor 51 is satisfied. The setting operation (S100) is an operation where the switcher 319 sets a gain A and a compensating torque C. The output operation (S200) is an operation where a manipulated variable $u_c$ based on the gain A and the compensating torque C is outputted. When the stop condition of the CR motor 51 is satisfied (S300: Yes), the CR motor controller 31 performs a stop process of the CR motor 51 (S400), thereby to stop the CR motor 51. Through these steps, the CR motor controller 31 controls the CR motor 51, thereby moving the carriage 41 from the one end to the other end in the main scanning direction.

As explained above, in the printer apparatus 1, existence of a deadband is taken into account. The deadband is from when the CR motor 51 starts moving to when the speed detector 311, by being inputted two pulses of the encoder signal, detects the angular speed of the CR motor 51. In view of the above, before the measurement value $\omega_m$ becomes greater than zero, the reduced correction amount A·d*, which is from zero percent to less than 100 percent of the correction amount d* determined by the disturbance observer 317, and the predetermined fixed correction amount C are added to the manipulated variable $u_0$ determined by the speed controller 314, thereby correcting the manipulated variable $u_0$.

Thus, according to the printer apparatus 1 of the present embodiment, even if the disturbance observer 317 overestimates disturbance in the deadband and therefore, the excessive correction amount d* is derived, the manipulated amount $u_0$ obtained by the speed controller 314 would not be excessively corrected. As a result, abrupt acceleration of the CR motor 51, and therefore, abrupt acceleration of the carriage 41, can be inhibited.

In the printer apparatus 1 of the present embodiment, in order to suppress a possibility that a time period until which the CR motor 51 overcomes static friction may become longer due to the attenuation of the correction signal from the disturbance observer 317, the compensating torque C is added to the manipulated variable $u_0$. Accordingly, the manipulated variable $u_0$ is greatly corrected by a certain amount to such an extent that the CR motor 51 and the carriage 41 will not be abruptly accelerated, and thereby, the time period until which the CR motor 51 overcomes static friction can be shortened.

According to the present embodiment, therefore, abrupt acceleration of the CR motor 51 and the carriage 41 can be inhibited, and at the same time, delay in start of moving the CR motor 51 and the carriage 41 can be inhibited.

Moreover, in the printer apparatus 1 of the present embodiment, after the measurement value $\omega_m$ becomes greater than zero, the equivalent correction amount which is 100 percent of the correction amount d* determined by the disturbance observer 317 is added to the manipulated variable $u_0$ determined by the speed controller 314, thereby correcting the manipulated variable $u_0$.

According to the printer apparatus 1 of the present embodiment, therefore, abrupt acceleration of the carriage 41 due to the existence of the deadband can be inhibit, and delay in the start of moving the carriage 41 can be inhibited. As a result, the carriage 41 can be accelerated smoothly.

As shown in FIGS. 6A to 6F, in comparison to a conventional motor control method, the motor control method of the present embodiment can inhibit abrupt acceleration at an initial phase at the start of moving the CR motor 51 (the carriage 41). As a result, it is possible to inhibit the carriage 41 from tilting.

A reason why the carriage 41 tilts when abruptly accelerated is as follows. As shown in FIG. 2, when the carriage 41 is abruptly accelerated, a connection point, which serves as a point of application of force acting on the carriage 41 from the endless belt 45, between the endless belt 45 and the carriage 41 is shifted precedingly in the main scanning direction, and thus, an end portion of the carriage 41, which is at a side opposite to the point of application of force, will be delayed in the start of the moving. According to the present embodiment, since it is possible to inhibit abrupt acceleration, the above-explained tilting of the carriage 41 can be inhibited.

In addition, deterioration in quality of an image formed onto a sheet due to the situation can be suppressed where the tilting of the carriage 41 is not recovered, and misalignment of landing positions of the ink droplets ejected from the recording head 21 which is tilted in the same way as the carriage 41 is caused even when the recording head 21 moves to an ink droplet ejecting area.

In this embodiment, the encoder 55 and the speed detector 311 are examples of a measurement unit and a measurement step in the present invention. The target speed instructor 312, the deviation output unit 313, and the speed controller 314 are examples of a speed control unit and a speed control step in the present invention. The corrector 315, the compensating torque generator 316, the output attenuator 318, and the switcher 319 are examples of a correction unit and a correction step in the present invention. The driving circuit 53 is an example of a drive unit and a drive step in the present invention. The disturbance observer 317 is an example of a disturbance suppressing unit and a disturbance suppressing step in the present invention. The recording head 21 and the carriage 41 are examples of an image forming unit and a driven object in the present invention. The CR motor 51 is an example of a motor in the present invention.

The present invention should not be limited by the above-described embodiment, and can be practiced in various manners. For example, in the above-described embodiment, a rotary encoder is used as the encoder 55; however, instead of the rotary encoder, a liner encoder may be used as the encoder 55.

That is, the printer apparatus 1 may be provided with a timing slit on which slits are formed at constant minute intervals along the moving pass of the carriage 41. The carriage 41 may be provided with a sensor element which reads the intervals between the slits formed on the timing slit and outputs pulse signals corresponding to the position of the carriage 41. Thereby, the position of the carriage 41 may be detected.

In this case, the speed of the carriage 41 is measured by the speed detector 311 based on the pulse signals of the liner encoder. The CR motor 51 is controlled with a measurement value measured as above.

What is claimed is:

1. A motor control device comprising:
    a measurement unit that measures speed of one of a motor and a driven object which is driven by the motor;
    a speed control unit that determines a manipulated variable for the motor, the manipulated variable corresponding to a target speed of the one of the motor and the driven object;
    a correction unit that corrects the manipulated variable determined by the speed control unit;
    a drive unit that drives the motor based on a corrected manipulated variable corrected by the correction unit; and
    a disturbance suppressing unit that determines, by estimating disturbance based on the corrected manipulated variable corrected by the correction unit and a measurement value of the speed measured by the measurement unit, a correction amount to correct the manipulated variable obtained by the speed control unit so as to suppress the disturbance;
    wherein the correction unit, during a time period before the measurement value of the speed becomes greater than zero, corrects the manipulated variable in such a manner that a reduced correction amount which is from zero percent to less than 100 percent of the correction amount determined by the disturbance suppressing unit, is added to the manipulated variable determined by the speed control unit.

2. The motor control device according to claim 1, wherein, the correction unit adds a predetermined fixed amount to the manipulated variable, in addition to the reduced correction amount, during the time period.

3. The motor control device according to claim 1, wherein, the correction unit, after the measurement value of the speed becomes greater than zero, corrects the manipulated variable in such a manner that an equivalent correction amount which is 100 percent of the correction amount determined by the disturbance suppressing unit is added to the manipulated variable determined by the speed control unit.

4. The motor control device according to claim 1, wherein, the disturbance suppressing unit determines the correction amount such that, the disturbance is estimated by deriving a deviation between
    an output of an inverse model of a transfer function of a controlled object obtained by inputting the measurement value of the speed to the inverse model and
    the corrected manipulated variable corrected by the correction unit.

5. The motor control device according to claim 1, wherein, the reduced correction amount is a constant amount.

6. An image forming apparatus comprising:
    an image forming unit that forms an image onto a sheet;
    a motor that conveys the image forming unit;
    a measurement unit that measures speed of one of the motor and the image forming unit;
    a speed control unit that determines a manipulated variable for the motor, the manipulated variable corresponding to a target speed of the one of the motor and the image forming unit;
    a correction unit that corrects the manipulated variable determined by the speed control unit;
    a drive unit that drives the motor based on a corrected manipulated variable corrected by the correction unit; and
    a disturbance suppressing unit that determines, by estimating disturbance based on the corrected manipulated variable corrected by the correction unit and a measurement value of the speed measured by the measurement unit, a correction amount to correct the manipulated variable obtained by the speed control unit so as to suppress the disturbance;
    wherein the correction unit, during a time period before the measurement value of the speed becomes greater than zero, corrects the manipulated variable in such a manner that a reduced correction amount which is from zero percent to less than 100 percent of the correction amount determined by the disturbance suppressing unit, is added to the manipulated variable determined by the speed control unit.

7. The image forming apparatus according to claim 6, wherein, the correction unit adds a predetermined fixed amount to the manipulated variable, in addition to the reduced correction amount, during the time period.

8. The image forming apparatus according to claim 6, wherein, the correction unit, after the measurement value of the speed becomes greater than zero, corrects the manipulated variable in such a manner that an equivalent correction amount which is 100 percent of the correction amount determined by the disturbance suppressing unit is added to the manipulated variable determined by the speed control unit.

9. The image forming apparatus according to claim 6, wherein,
the disturbance suppressing unit determines the correction amount such that, the disturbance is estimated by deriving a deviation between
an output of an inverse model of a transfer function of a controlled object obtained by inputting the measurement value of the speed to the inverse model and
the corrected manipulated variable corrected by the correction unit.

10. The image forming apparatus according to claim 6, wherein,
the reduced correction amount is a constant amount.

11. A motor control method comprising:
a measurement step of measuring speed of one of a motor and a driven object which is driven by the motor;
a speed control step of determining a manipulated variable for the motor, the manipulated variable corresponding to a target speed of the one of the motor and the driven object;
a correction step of correcting the manipulated variable determined in the speed control step;
a drive step of driving the motor based on a corrected manipulated variable corrected in the correction step; and
a disturbance suppressing step of determining, by estimating disturbance based on the corrected manipulated variable corrected in the correction step and a measurement value of the speed measured in the measurement step, a correction amount to correct the manipulated variable obtained in the speed control step so as to suppress the disturbance;
wherein the correction step includes adding a reduced correction amount which is from zero percent to less than 100 percent of the correction amount determined in the disturbance suppressing step, to the manipulated variable determined in the speed control step, during a time period before the measurement value of the speed becomes greater than zero.

12. The motor control method according to claim 11, wherein,
the correction step includes adding a predetermined fixed amount to the manipulated variable, in addition to the reduced correction amount, during the time period.

13. The motor control method according to claim 11, wherein,
the correction step includes correcting the manipulated variable by adding an equivalent correction amount which is 100 percent of the correction amount determined in the disturbance suppressing step, to the manipulated variable determined in the speed control step after the measurement value of the speed becomes greater than zero.

14. The motor control method according to claim 11, wherein,
the disturbance suppressing step includes determining the correction amount such that, the disturbance is estimated by deriving a deviation between
an output of an inverse model of a transfer function of a controlled object obtained by inputting the measurement value of the speed to the inverse model and
the corrected manipulated variable corrected in the correction step.

15. The motor control method according to claim 11, wherein,
the reduced correction amount is a constant amount.

* * * * *